United States Patent
Sangili

(10) Patent No.: US 7,181,741 B2
(45) Date of Patent: Feb. 20, 2007

(54) APPARATUS AND METHOD TO MINIMIZE BLOCKING OVERHEAD IN UPCALL BASED MXN THREADS

(75) Inventor: Vasudevan Sangili, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 722 days.

(21) Appl. No.: 10/355,581

(22) Filed: Jan. 30, 2003

(65) Prior Publication Data

US 2004/0154021 A1 Aug. 5, 2004

(51) Int. Cl.
*G06F 9/455* (2006.01)

(52) U.S. Cl. ............................ 718/1; 718/102; 719/320

(58) Field of Classification Search ................ 718/100, 718/102, 103, 1, 106; 719/312, 320, 330
See application file for complete search history.

(56) References Cited

U.S. PATENT DOCUMENTS

| | | | | |
|---|---|---|---|---|
| 6,076,157 | A * | 6/2000 | Borkenhagen et al. | 712/228 |
| 6,105,051 | A * | 8/2000 | Borkenhagen et al. | 718/103 |
| 6,212,544 | B1 * | 4/2001 | Borkenhagen et al. | 718/103 |
| 6,240,502 | B1 * | 5/2001 | Panwar et al. | 712/15 |
| 6,542,920 | B1 * | 4/2003 | Belkin et al. | 718/104 |
| 6,567,839 | B1 * | 5/2003 | Borkenhagen et al. | 718/103 |
| 6,697,935 | B1 * | 2/2004 | Borkenhagen et al. | 712/228 |
| 6,766,349 | B1 * | 7/2004 | Belkin | 718/104 |
| 7,039,911 | B2 * | 5/2006 | Chase et al. | 718/1 |
| 2001/0055277 | A1 * | 12/2001 | Steely et al. | 370/236 |
| 2003/0088609 | A1 * | 5/2003 | Guedalia et al. | 709/107 |

OTHER PUBLICATIONS

Anderson, Thomas E., Brian N. Bershad, Edward D Lazowska, and Henry M. Levy. "Scheduler Activations: Effective Kernel Support for the User-Level Management of Parallelism." ACM Transactions on Computer Systems, vol. 10, No. 1, (Feb. 1992): pp. 53-79.*
Design of the New GNU Thread Library By Ulrich Drepper, Webpages [online] [retrieved on Dec. 23, 2002]. Total pages: 12. Retrieved from the internet:,< URL:http://people.redhat.com/drepper/glibcthreads/.html>.

* cited by examiner

*Primary Examiner*—William Thomson
*Assistant Examiner*—Nathan Price

(57) ABSTRACT

An embodiment of the invention provides a method to minimize blocking overhead in upcall based M×N threads. The method includes: setting a limit for the number of outstanding unbound user threads that has blocked and has invoked a blocking upcall mechanism on a particular virtual processor at any point in time; after reaching the limit, if the user threads still blocks, then temporarily disabling the upcall mechanism for these user threads; and re-enabling the upcall mechanism for the user threads during the next context switch time. In another embodiment, an apparatus implemented in a computer to minimize blocking overhead in upcall based M×N threads, includes: a virtual processor configured to track the number of blocked unbound threads that are blocked; and an M×N user space scheduler configured to disable a block upcall handler and an unblock upcall handler for the blocked unbound threads if the number of blocked unbound threads has reached a limit value.

27 Claims, 4 Drawing Sheets

APPARATUS AND METHOD TO MINIMIZE BLOCKING OVERHEAD IN UPCALL BASED MXN THREADS

TECHNICAL FIELD

Embodiments of the present invention relate generally to minimizing blocking overhead in upcall based M×N threads.

BACKGROUND

A thread is an independent flow of control within a process. Threads models are the different implementations of multithreading techniques that are provided by a computer operating system. Multithreading is a technique that allows performing of multiple tasks in a single program (process) concurrently.

FIG. 1 is a block diagram illustrating various threads models. The components shown in FIG. 1 operate within or are implemented in a computer (not shown). In an M×1 threads model 105, the user threads (UT) 110a, 110b, 110c are scheduled by a user scheduler 115 to execute within the process context. As known to those skilled in the art, a user thread (UT) is a thread that is visible to the application (i.e., visible in the user space application) and is managed by a threads library. The kernel is not aware of the user threads and schedules of the underlying process. Since the threads library is responsible for management and scheduling of the user threads, the kernel scheduler 120 does not manage and schedule the user threads 110a–110c. The kernel scheduler 120 schedules this process on the central processing unit (CPU 125). As known to those skilled in the art, the operating system resides in the area known as the kernel space. The kernel is represented by the dashed lines 161 in FIG. 1 and contains the kernel scheduler 120.

A bound thread is defined as a user thread that is directly bound to a kernel thread. In contrast, unbound threads are user threads that are multiplexed over one or more kernel threads. Unbound threads are maintained in the user space library and execute in the context of the underlying kernel thread (KT). The kernel threads (KT) are kernel schedulable entities that are visible to the operating system kernel. The kernel threads are generally created from the userspace threads library by calling a particular system call.

In a 1×1 threads model 130, the user threads (UT) 135a, 135b, and 135c are bound to the underlying kernel threads (KT) 140a, 140b, and 140c. The bound threads are scheduled directly by the kernel scheduler 120. There is no userspace scheduler for scheduling the user threads (UT) 135a, 135b, and 135c. Note that a userspace is an area where the user programs reside. The underlying kernel threads 140a, 140b, and 140c are scheduled by the kernel scheduler 120 on CPUs 125a and 125b. In the 1×1 threads model, when a user thread blocks in the kernel, other user threads can continue to run on their corresponding kernel threads.

In an M×N threads model 150, the user threads (UT) either can be multiplexed on top of a kernel thread (M×1 threads model) as in the case of the user threads 155a, 155b, and 155c, or bound to the underlying kernel threads (1×1 threads model) as in the case of the user thread 155d. The multiplexed user threads are scheduled by the M×M user scheduler 115a and the bound user threads (e.g., UT 155d), and their underlying kernel threads 160a, 160b, and 160c are scheduled by the kernel scheduler 120. Related details about the M×M threads model and scheduler activation (SA) blocking/unblocking are described further in, for example, Ulrich Drepper, "Design of the New GNU Thread Library", (Apr. 13, 2002), which is hereby fully incorporated herein by reference.

The M×N threads model is the most flexible and the most complex of the three thread models described above. Excessive I/O (input/output) bound applications do not work well for the M×N threads model and hurt the performance of the unbound threads. The reason for these problems is that the M×N models need to have blocking/unblocking upcall mechanism (or similar mechanism) to make sure that when one unbound user thread blocks in the kernel, other unbound user threads can make progress (i.e., run). As known to those skilled in the art, an upcall mechanism is a notification mechanism that is used by the kernel to inform the threads library of some event happening in the kernel, such as for example, the kernel needs to sleep for some resource. However, this mechanism has significant overhead if all the unbound user threads keep performing blocking and unblocking, as this operation involves creating a new kernel thread from the kernel when an unbound user thread blocks and the return of the original kernel thread after the thread unblocks. This operation is expensive when performed very often and significantly affects the application performance. This negative effect on performance was seen when running the industry standard VolanoMark benchmark with the M×N threads. Because of the complexity and high overhead with the M×N threads model, various latest products have discontinued the support for the M×N threads model. For example, the M×N threads model is not supported by the Solaris 9 product from Sun Microsystems, Inc., and is not implemented in Linux due to the overhead associated with the M×N model. In contrast, the bound user threads do not have the above-mentioned overhead, as bound user threads have 1-to-1 mapping with the kernel thread.

Thus, the current approaches and/or technologies are limited to particular capabilities and/or suffer from various constraints.

SUMMARY OF EMBODIMENTS OF THE INVENTION

At least some of the various embodiments are now described. In one embodiment of the invention, a method is provided to minimize blocking overhead in upcall based M×N threads.

The method comprises: setting a limit for the number of outstanding unbound user threads that has blocked and has invoked a blocking upcall mechanism on a particular virtual processor at any point in time; and after reaching the limit, if the user threads still blocks, then disabling the upcall mechanism temporarily for these user threads. At the time of next context switch of these user threads, the upcall mechanism will be re-enabled.

The limit is a configurable value to support different types of applications.

The method may also include the following step. If the limit has not been reached, then the user thread is placed in a runqueue of the virtual processor.

In another embodiment, an apparatus implemented in a computer to minimize blocking overhead in upcall based M×N threads, includes: a virtual processor configured to track the number of blocked unbound threads that are blocked; and an M×N user space scheduler configured to disable a block upcall handler and an unblock upcall handler for the blocked unbound threads if the number of blocked unbound threads has reached a limit value.

Other embodiments of the invention may include, but are not limited to, the various embodiments described below.

These and other features of an embodiment of the present invention will be readily apparent to persons of ordinary skill in the art upon reading the entirety of this disclosure, which includes the accompanying drawings and claims.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

An embodiment of the invention improves the performance of excessively I/O (input/output) bound applications by reducing the blocking and unblocking overhead associated with the unbound threads in the M×N threads model.

Figure 2:
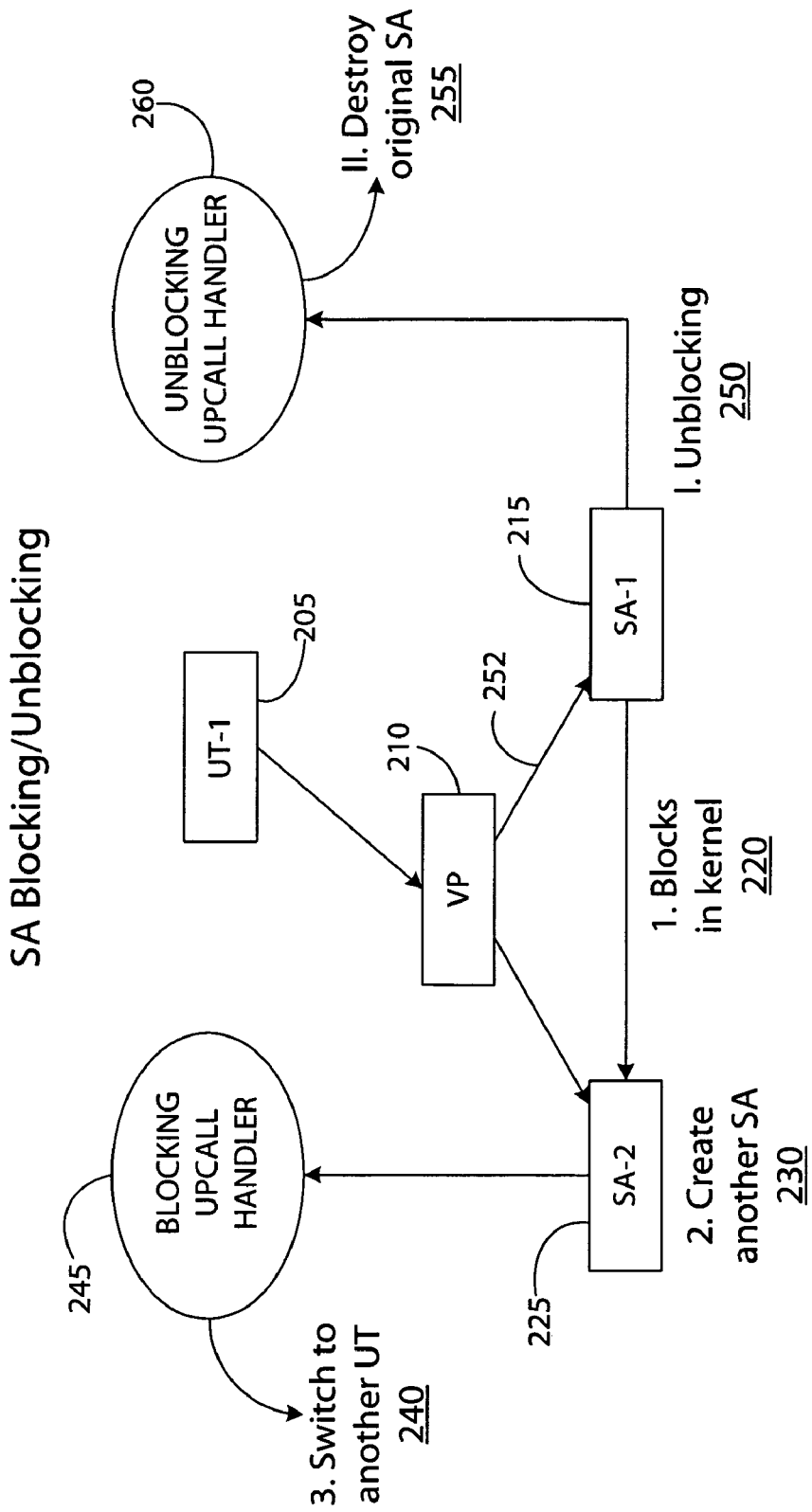
FIG. 2 is a block diagram illustrating a known scheduler activation blocking/unblocking process.

For background purposes, reference is now made to FIG. 2 which illustrates a block diagram of a known scheduler activation blocking/unblocking process. Initially, a user thread (UT-1) 205 will run on a virtual processor (VP) 210. The virtual processor 210 initially is associated with a scheduler activation (SA-1) 215.

As known to those skilled in the art, a virtual processor is a per kernel thread data structure for bound user threads and per scheduler activation data structure for unbound user threads. For unbound user threads, the virtual processor also contains runqueues associated with the underlying scheduler activation. The virtual processor is an abstraction in the userspace for the actual central processing unit (CPU).

As also known to those skilled in the art, a scheduler activation (SA) is an execution context in the kernel where the unbound user threads will run. The scheduler activation is similar to the kernel thread in concept.

Assume that the scheduler activation (SA-1) 215 blocks in the kernel (step 220). Therefore, the userspace scheduler needs to insure that other user threads in the user space will continue to run. As a result, the kernel will create a second scheduler activation (SA-2) 225 to be associated with the virtual processor 210. Therefore, the association between the scheduler activation (SA-1) 215 and the user thread (UT-1) 205 is broken.

The scheduler activation (SA-2) 225 will call a function known as a blocking upcall handler 245 which is a function in the userspace. This function is called in the user space from the kernel to inform the user space scheduler 115 that a kernel thread has blocked in the kernel. This function 245 will permit the SA-2 225 to switch to another user thread so that the SA-2 225 can run that other user thread (and/or remaining user threads) (step 240).

An example application of when the SA-1 215 blocks in the kernel (step 220) is in a chatting application when a user sends a question to another user and is waiting for a reply. As data is waited upon, the blocking occurs. When the reply is received, then the unblocking occurs. The Volanomark benchmark closely simulates this chatting application.

When the SA-1 215 (which has blocked in the kernel) has unblocked (step 250), then the conventional process in FIG. 2 will proceed in unblocking by having the SA-1 215 call an unblock upcall handler 260 (step 250), as discussed below. Since a second scheduler activation has been created (SA-2 225), the first scheduler activation (SA-1 215) is disassociated from the virtual processor 210 (the disassociation is illustrated by step 252). The original scheduler activation (SA-1) 215 is destroyed (step 255) when unblocking is performed. Since the original SA-1 215 is destroyed, the SA-2 225 will place the user thread (UT-1) 205 in the runqueue of the virtual processor 210 to make it run.

The above-mentioned steps of creating the SA-2 225 and destroying the original SA-1 215 lead to significant overhead and can negatively affect the performance of the application.

Figure 3:
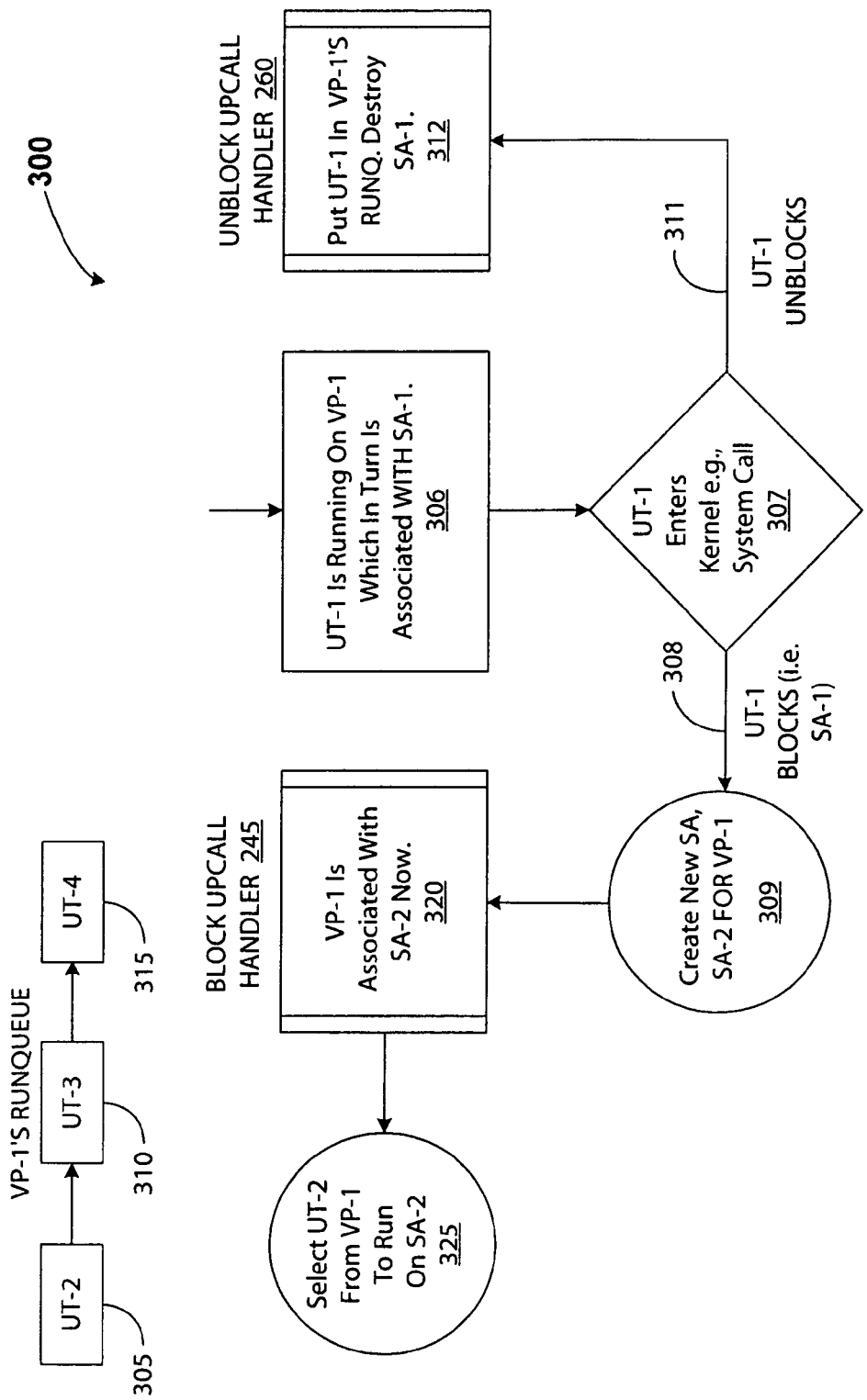
FIG. 3 is a flowchart illustrating a known scheduler activation blocking/unblocking process as performed in an M×N threads model.

FIG. 3 is a flowchart illustrating a known scheduler activation blocking/unblocking process 300 as performed in an M×N threads model. Continuing reference is also made to FIG. 2. Assume that user threads UT-2 305, UT-3 310, and UT-4 315 are in the virtual processor's 210 runqueue. User thread (UT-1) 205 is running on virtual processor 210, which in turn is associated with SA-1 215 (step 306). User thread (UT-1) enters into the kernel 161 (step 307). A system call is a mechanism by which the kernel provides operating system services to userspace.

When UT-1 205 blocks (step 308), then SA-1 215 blocks. A new SA (i.e., SA-2 225) is created for the virtual processor 210 (step 309). When the function call is made for the block upcall handler 245, the virtual processor 210 is associated with SA-2 225 (step 320). The user thread (UT-2) 305 is selected from the virtual processor 210 to run on SA-2 225 (step 325).

When UT-1 unblocks (step 311), then a function call is made to the unblock call handler 260, and the UT-1 205 is placed in the virtual processor's 210 runqueue; the SA-1 312 is then destroyed (step 312).

Figure 1:
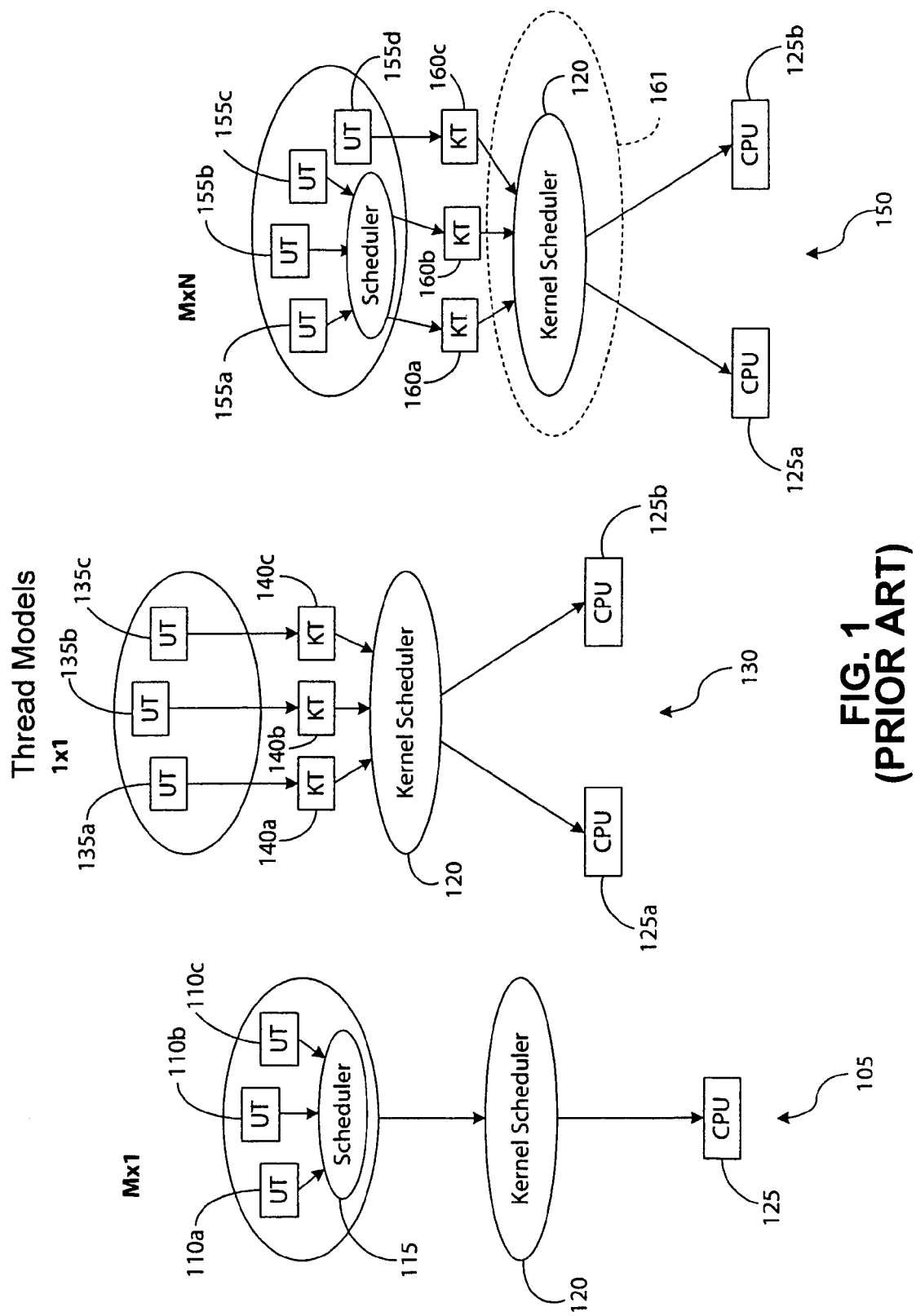
FIG. 1 is a block diagram illustrating various conventional threads models.

In contrast, an embodiment of the invention provides a mechanism and method to significantly reduce the blocking and unblocking upcall overhead in the M×N threads model. This overhead is due to the function call of the block upcall handler 245 and unblocking upcall handler 260 and their associated housekeeping. With this mechanism and method, a limit is set for the number of outstanding unbound user threads that has blocked and has invoked the blocking upcall handler on a particular virtual processor at any point in time. This limit value is also referred to as the "virtual processor block limit" and is configurable value that may be varied. A counter value in each particular virtual processor is compared with the virtual processor block limit, as discussed below. After reaching this limit, if the user threads still block on a given virtual processor (since a scheduler activation SA is blocking on the given virtual processor), then the M×N userspace scheduler 115 (FIG. 1) disassociates these user threads from the virtual processor and disables the upcall mechanism invocation for these user threads. As a result, if the user threads block immediately, they will not have the overhead of blocking and unblocking upcall. These user threads will sleep directly in the kernel. On the next context switch (either voluntary or involuntary) of each of these user threads, the thread's scheduler activation (SA) is destroyed and the user thread will be placed on the given virtual processor's runqueue. The M×N userspace scheduler 115 keeps on performing this operation for all unbound threads on this given virtual processor (where each of these unbound threads blocks in the kernel), until the given virtual processor's block limit goes below the configurable value.

Figure 4:
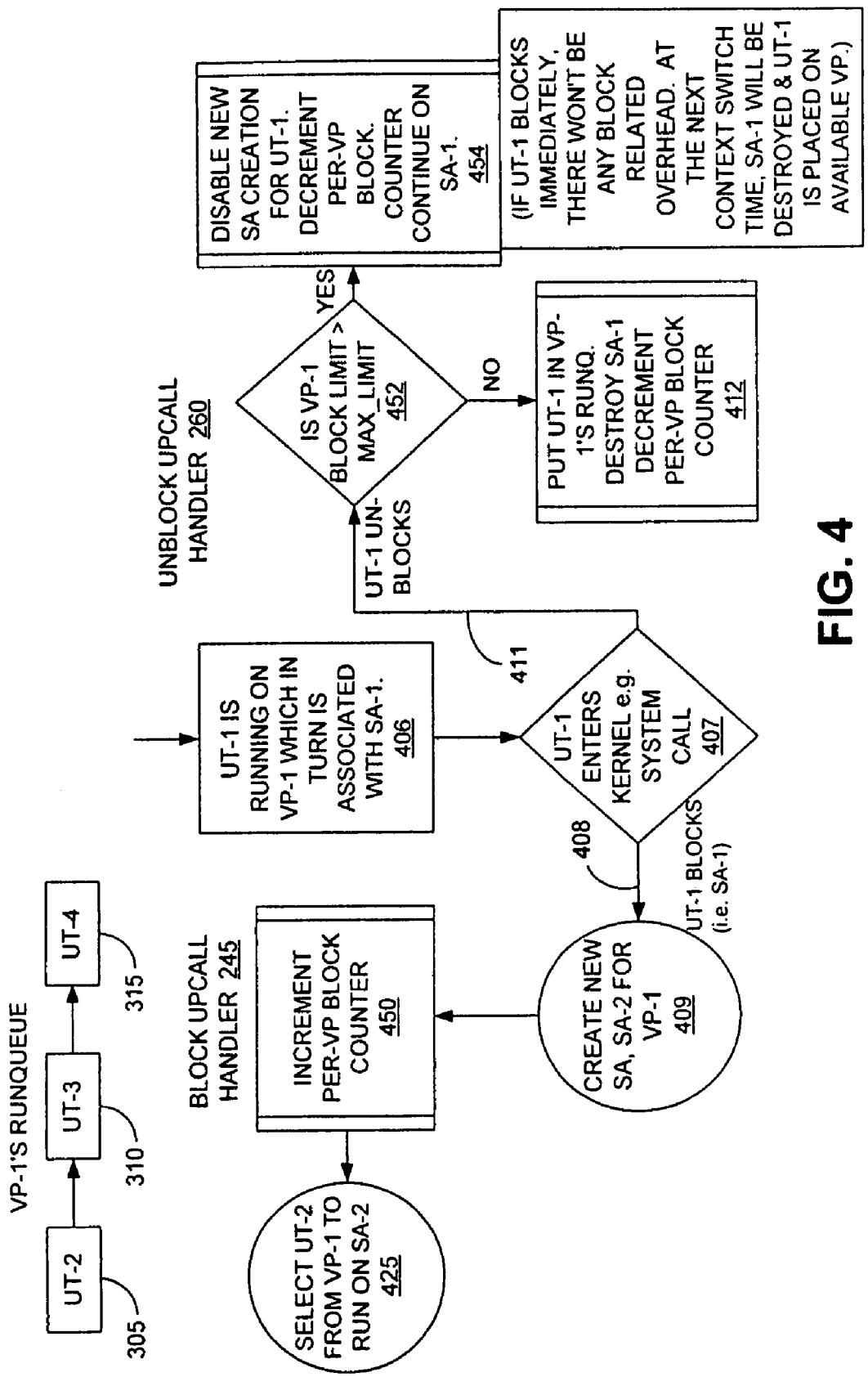
FIG. 4 is a flowchart illustrating a scheduler activation blocking/unblocking process as performed in an M×N threads model, in accordance with an embodiment of the invention.

FIG. 4 is a flowchart illustrating a scheduler activation blocking/unblocking process as performed in an M×N threads model, in accordance with an embodiment of the invention. Continuing reference is also made to FIG. 2 for purposes of explaining some features of the embodiments of the invention. Assume that user threads UT-2 305, UT-3 310, and UT-4 315 are in the virtual processor's 210 runqueue. User thread (UT-1) 205 is running on virtual processor 210, which in turn is associated with SA-1 215 (step 406). User thread (UT-1) enters into the kernel 161 (step 407).

When SA-1 blocks in the kernel (step 408), then UT-1 205 blocks. A new scheduler activation (i.e., SA-2 225) is created for the virtual processor 210 (step 409). A counter in the data structure of each virtual processor 210 is then incremented whenever a particular user thread (e.g., UT-1 205) blocks in the kernel (step 450).

When the function call is made by SA-2 225 for the block upcall handler 245, the virtual processor 210 is associated with SA-2 225 (step 425), and the user thread (UT-2) 305 is selected from the virtual processor 210 to run on SA-2 225 (step 425).

When SA-1 215 unblocks in the kernel (step 411), then UT-1 205 will unblock. A check is then performed by the virtual processor 210 to determine if the counter value of the virtual processor 210 is greater than the configured virtual processor block limit value (step 452). If the counter value is not greater than the configured block limit value, then the user thread (UT-1) 205 is placed in the virtual processor's 210 runqueue; the SA-1 215 is then destroyed; and the counter value is decremented since unblocking of a user thread has occurred. The above steps are shown in FIG. 4 as step (412). If the counter value is greater than the configured value, then creation of a scheduler activation (SA) for the UT-1 205 is disabled; the counter value is decremented since unblocking of a user thread has occurred, and UT-1 205 continues to run on SA-1 215. The M×N userspace scheduler 115a disables the unblock upcall invocation for this user thread (UT-1) 205. In other words, the block upcall handler 245 and the unblock upcall handler 260 are not called. Since the upcall mechanism is disabled, a new scheduler activation (SA) is not created, and the user thread (UT-1) 205 continues to run on the original scheduler activation (i.e., SA-1 215). The above steps are shown in step (454).

In step (454), if the user thread (UT-1) 205 blocks immediately, there will not be any block related overhead. If the user thread (UT-1) 205 blocks immediately, it will not have the overhead of blocking and unblocking upcall since a new scheduler activation is not created and the UT-1 205 continues to run on scheduler activation (SA-1) 215. The user thread (UT-1) 205 will sleep directly in the kernel. At the next context switch time, SA-1 215 will be destroyed and UT-1 205 is placed on an available virtual processor. The upcall mechanism is also enabled for UT-1 205.

The M×N userspace scheduler keeps on performing this operation in step (454) for all unbound threads on this virtual processor (where each of these unbound threads blocks in the kernel), until the counter value goes below the configurable virtual processor block limit value. Note that whenever a user thread (UT) unblocks (i.e., calls the unblock upcall handler 260 (step 411), then the counter value is decremented (as seen in step 412 and 454).

The various engines or modules discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A method to minimize blocking overhead in upcall based M×N threads, the method comprising:
   setting a limit for the number of outstanding unbound user threads that have blocked and have invoked a blocking upcall mechanism on a particular virtual processor at any point in time;
   running a user thread on a scheduler activation where the user thread is an unbound thread and the scheduler activation is an execution context in a kernel;
   when the scheduler activation unblocks by calling an unblock upcall handler and if the limit has been exceeded, then running the user thread on the scheduler activation and temporarily disabling an upcall mechanism for the user thread; and
   re-enabling the upcall mechanism for the user thread during a next context switch time.

2. The method of claim 1, wherein the limit is a configurable value.

3. The method of claim 1, further comprising:
   if the limit has not been reached, then the user thread is placed in a runqueue of the virtual processor.

4. The method of claim 1, further comprising:
   incrementing a counter in the virtual processor whenever a user thread has blocked.

5. The method of claim 1, further comprising:
   decrementing a counter in the virtual processor whenever a user thread has unblocked when the unblock upcall handler is called.

6. The method of claim 1, wherein temporarily disabling the upcall mechanism comprises preventing in creating a new scheduler activation for the user thread.

7. The method of claim 1, further comprising:
   when the scheduler activation unblocks and if the limit has not been exceeded, then placing the user thread in a runqueue of the virtual processor.

8. The method of claim 7, wherein the scheduler activation is then destroyed after placing the user thread in the runqueue of the virtual processor.

9. An article of manufacture, comprising:
   a machine-readable medium having stored thereon instructions to:
   set a limit for the number of outstanding unbound user threads that have blocked and have invoked a blocking upcall mechanism on a particular virtual processor at any point in time;
   run a user thread on a scheduler activation where the user thread is an unbound thread, and the scheduler activation is an execution context in a kernel; and
   when the scheduler activation unblocks by calling an unblock upcall handler and if the limit has been exceeded, then run the user thread on the scheduler activation and disable an upcall mechanism for the user thread.

10. An apparatus for minimizing blocking overhead in upcall based M×N threads, the apparatus comprising:
    means for setting a limit for the number of outstanding unbound user threads that have blocked and have invoked a blocking upcall mechanism on a particular virtual processor at any point in time;
    means for running a user thread on a scheduler activation where the user thread is an unbound thread and the scheduler activation is an execution context in a kernel;
    means for temporarily disabling an upcall mechanism for the user thread and running the user thread on the scheduler activation; and
    means for re-enabling the upcall mechanism for the user thread during a next context switch time.

11. A method to minimize blocking overhead in upcall based M×N threads, the method comprising:
    setting a limit for the number of outstanding unbound user threads that have blocked and have invoked a blocking upcall mechanism on a particular virtual processor at any point in time;
    running a user thread on a scheduler activation where the user thread is an unbound thread, and the scheduler activation is an execution context in a kernel; and
    when the scheduler activation unblocks by calling an unblock upcall handler and if the limit has been exceeded, then running the user thread on the scheduler activation and temporarily disabling an upcall mechanism for the user thread.

12. The method of claim 11, wherein the limit is a configurable value.

13. The method of claim 11, further comprising:
    if the limit has not been reached, then the user thread is placed in a runqueue of the virtual processor.

14. The method of claim 11, further comprising:
    incrementing a counter in the virtual processor whenever a user thread has blocked.

15. The method of claim 11, further comprising:
    decrementing a counter in the virtual processor whenever a user thread has unblocked when the unblock upcall handler is called.

16. The method of claim 11, wherein temporarily disabling the upcall mechanism comprises preventing in creating a new scheduler activation for the user thread.

17. The method of claim 11, further comprising:
    when the scheduler activation unblocks and if the limit has not been exceeded, then placing the user thread in a runqueue of the virtual processor.

18. An apparatus implemented in a computer to minimize blocking overhead in upcall based M×N threads, the apparatus comprising:
    a virtual processor configured to set a limit for the number of blocked unbound threads that are blocked and have invoked a blocking upcall mechanism; and
    an M×N user space scheduler configured to disable a block upcall handler and an unblock upcall handler for an unbound user thread and to run the unbound user thread on a scheduler activation, if the scheduler activation unblocks by calling the unblock upcall handler and the limit has been exceeded.

19. The apparatus of claim 18, wherein the M×N user space scheduler is configured to re-enable the block upcall handler and the unblock upcall handler for the unbound user thread during the next context switch time.

20. The apparatus of claim 18, wherein the limit value is a configurable value.

21. The apparatus of claim 18, if the limit has not been reached, then the unbound user thread is placed in a runqueue of the virtual processor.

22. The apparatus of claim 18, wherein the virtual processor contains a counter that is incremented whenever a user thread has blocked when the block upcall handler is called and is decremented whenever a user thread has unblocked when the unblock upcall handler is called.

23. The apparatus of claim 18, wherein the virtual processor is an abstraction in a userspace for a central processing unit.

24. The apparatus of claim 18, wherein the M×N user space scheduler schedules a plurality of multiplexed user threads.

25. The apparatus of claim 18, wherein the scheduler disables the block upcall handler and unblock upcall handler by preventing in creating a new scheduler activation for the unbound user thread.

26. The apparatus of claim 18, wherein the scheduler places the unbound user thread in a runqueue of the virtual processor when the scheduler activation unblocks.

27. The apparatus of claim 26, wherein the scheduler destroys the scheduler activation after placing the unbound user thread in the runqueue of the virtual processor.

* * * * *

UNITED STATES PATENT AND TRADEMARK OFFICE
CERTIFICATE OF CORRECTION

PATENT NO. : 7,181,741 B2
APPLICATION NO. : 10/355581
DATED : February 20, 2007
INVENTOR(S) : Vasudevan Sangili It is certified that error appears in the above-identified patent and that said Letters Patent is hereby corrected as shown below:

On the Title page, in field (54), in column 1, in "Title", line 3, delete "MXN" and insert -- M×N --, therefor.

In column 1, line 3, delete "MXN" and insert -- M×N --, therefor.

In column 1, line 62, delete "M×M" and insert -- M×N --, therefor.

In column 1, line 66, delete "M×M" and insert -- M×N --, therefor.

Signed and Sealed this

Fourth Day of August, 2009

JOHN DOLL
*Acting Director of the United States Patent and Trademark Office*